United States Patent [19]

Robson

[11] 3,720,753

[45] March 13, 1973

[54] METHOD FOR PREPARING A SMALL PORE SYNTHETIC ZEOLITE

[75] Inventor: Harry E. Robson, Baton Rouge, La.

[73] Assignee: Esso Research and Engineering Company, Linden, N.J.

[22] Filed: Feb. 22, 1971

[21] Appl. No.: 117,755

[52] U.S. Cl. ............... 423/329, 252/455 Z, 423/328
[51] Int. Cl. ............................................. C01b 33/28
[58] Field of Search .....23/113, 112, 111; 252/455 Z; 260/448 C

[56] References Cited

UNITED STATES PATENTS

| | | | |
|---|---|---|---|
| 3,247,195 | 4/1966 | Kerr | 252/430 X |
| 2,950,952 | 8/1960 | Breck et al. | 23/113 |
| 3,056,654 | 10/1962 | Barrer et al. | 23/113 |
| 3,216,789 | 11/1965 | Breck et al. | 23/113 |

OTHER PUBLICATIONS

Barrer et al. "J. Chemical Society" 1953, Pages 4029–4035

Barrer et al. "J. Chemical Society" 1956, Pages 2882–2891

Primary Examiner—Edward J. Meros
Attorney—Pearlman & Schlager and Arnold H. Krumholz

[57] ABSTRACT

A synthetic small pore crystalline zeolite having a structure and X-ray diffraction pattern similar to that of synthetic zeolite ZK-5 is prepared by digesting an aqueous reactant mixture containing silica, alumina, and either a mixture of potassium oxide and cesium oxide, or potassium oxide, cesium oxide and sodium oxide at a temperature of from 60° to 120°C. The zeolite product contains cesium cations as well as potassium cations in its as-synthesized form. A substantial portion of the cations is in an inaccessable position in the crystal lattice so that it is essentially unexchangable. The zeolite product is used as a selective adsorbent or as a catalyst after suitable modification by base exchange and deposition of a catalytically active metal.

3 Claims, No Drawings

METHOD FOR PREPARING A SMALL PORE SYNTHETIC ZEOLITE

BACKGROUND OF THE INVENTION

1. Field of the Invention

The present invention relates to new small-pore synthetic zeolite materials and to methods for preparing same. More particularly, it relates to a synthetic crystalline aluminosilicate zeolite having a structure and X-ray diffraction pattern similar to that of the known zeolite "ZK-5", but having a novel composition in the as-synthetized form and which zeolite is superior to ZK-5 in having a higher degree of crystallinity, a higher degree of thermal stability, a higher surface area and a greater degree of selectivity, as measured by its adsorption of various molecules.

2. Description of the Prior Art

Crystalline aluminosilicate zeolites, commonly referred to as "molecular sieves", are now well known in the art. These materials are characterized by a very highly ordered crystalline structure arranged such that uniformly dimensioned pores result. The crystal structure of these zeolites involves a three-dimensional framework of $AlO_4$ and $SiO_4$ tetrahedra which are cross-linked by the sharing of oxygen atoms, so that the ratio of oxygen atoms to the total of aluminum and silicon atoms is equal to two. The electro-negativity of these tetrahedra is balanced by the presence within the crystal of cations, usually alkali metal cations, such as sodium and potassium ions. The term "molecular sieves" derives from the characteristic of these crystalline zeolite materials to selectively adsorb or reject molecules on the basis of their size, form and type. Thus the openings or pores of the crystalline zeolites, formed by the expulsion of water of hydration originally occupying these sites, will determine the particular molecular separation achievable with the particular zeolite. A number of synthetic crystalline zeolites have been prepared heretofore, and described, for example, in U.S. Pat. No. 3,013,982, wherein they are characterized by their composition and x-ray diffraction characteristics.

The present invention is concerned with a particular type of small-pore size zeolite, i.e. having pore openings from between about 3 to about 5.5 A, and with methods for preparing same. This material has a structure similar to that particular type of zeolite known as zeolite ZK-5, as so designated in U.S. Pat. No. 3,247,195, issued Apr. 19, 1966 to George T. Kerr, and assigned to Socony Mobil Oil Company. This material, in turn, is similar to a synthetic crystalline aluminosilicate known as "Zeolite A", as described in U.S. Pat. No. 2,882,243. The present zeolite, having a composition in the as-synthesized form which is different from that of both ZK-5 and Zeolite A, has certain properties, which are quite superior thereto. In addition, it would be impossible to produce the present zeolite in the manner described in the aforementioned patent.

The composition of zeolite ZK-5 as heretofore produced can stoichiometrically be expressed, in terms of mole ratios of oxides, as follows:

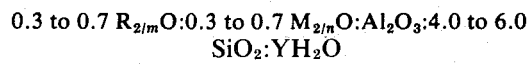

where R is selected from the group consisting of a nitrogen-containing cation derived from N,N'-dimethyltriethylenediammonium ion and mixtures of said cation with hydrogen, and m is the valence thereof, M is a metal and n the valence thereof, and Y is any value from about 6 to about 10.

The properties and characteristics of zeolites A and ZK-5 are compared in U.S. Pat. No. 3,247,195.

SUMMARY OF THE INVENTION

In accordance with the present invention a novel crystalline aluminosilicate zeolite and methods for its preparation are provided. This material, having superior physical and adsorptive properties, may be expressed, in terms of stoichiometric mole ratios of oxides, as follows:

wherein M may be either potassium or a mixture of potassium and sodium such that the ratio $Na/K \leq 1$, and Z may be any value from 0 to about 10, and wherein Y is from 4 to about 7, preferably from 6 to about 7, and most preferably from greater than 6 to about 7.

The X-ray diffraction pattern of the zeolite prepared by the present invention is contained in Table A, along with a comparison with that of zeolite ZK-5.

TABLE A

X-RAY DIFFRACTION PATTERN

| K—Cs Zeolite of the Present Invention | | Zeolite ZK–5 | |
|---|---|---|---|
| d | I/I° | d | I/I° |
| 13.39 | 47 | 13.3 | 18 |
| 9.46 | 68 | 9.41 | 100 |
| 7.73 | 15 | | |
| 6.68 | 30 | 6.62 | 6 |
| 5.95 | 100 | 5.93 | 41 |
| 5.44 | 2 | 5.41 | 48 |
| 5.04 | 6 | 5.03 | 2 |
| | | 4.69 | 6 |
| 4.43 | 43 | 4.41 | 50 |
| 4.21 | 47 | 4.19 | 34 |
| | | 3.98 | 22 |
| 3.84 | 51 | 3.81 | 18 |
| 3.69 | 9 | 3.66 | 6 |
| 3.43 | 53 | 3.43 | 13 |
| 3.22 | 60 | 3.22 | 35 |
| 3.13 | 9 | | |
| 3.04 | 26 | 3.02 | 28 |
| 2.96 | 32 | 2.94 | 21 |
| 2.89 | 4 | 2.88 | 2 |
| 2.83 | 53 | 2.81 | 26 |
| | | 2.75 | 9 |
| 2.65 | 15 | 2.64 | 11 |
| | | 2.59 | 2 |
| 2.55 | 34 | 2.54 | 9 |

Minor variations in the mole ratios of oxides within the ranges indicated above will not substantially affect the zeolite crystal structure or properties. The "Cs" designated cesium cation derived from the use of a cesium source such as cesium hydroxide as a reactant in the preparation of the crystalline zeolite.

Part of these cations may be exchanged with one or more hydrogen-containing or metal cations depending upon the intended use of the zeolite. Suitable cations that can be exchanged for a portion of the sodium and cesium cations include the monovalent, divalent, and trivalent metal cations, particularly those in Groups IIA, IIIB (including rare earths) and IIB of the Periodic Table of the Elements. Typical but non-limiting examples of such cations include Ca, Mg, Zn and the rare earths, as well as hydrogen and hydrogen precursor ions, such as ammonium cations. Suitable exchange techniques are well known in the art and will not be described here in detail; they are, however, performed without causing any substantial alteration in the basic crystal structure of the zeolite.

A substantial portion of the cations of the present zeolite is in an inaccessible position in the crystal lattice so that it is essentially unexchangable In order to incorporate the Cs cations, therefore, it is necessary to synthesize the present zeolites from starting materials which provide them, such as the cesium hydroxide mentioned above.

As is evidenced by the extensive body of art relating to molecular sieve preparations in general, and the specific art to Zeolite ZK-5 in particular, the process variables involved in the synthesis of molecular sieves are interdependent and highly critical in achieving the desired molecular sieve species in good yield and quality. In order to achieve a particularly desired result, a judicious selection of reactant molar ratios, crystallization times, reactant source materials and process conditions is required. The processes for producing synthetic crystalline aluminosilicate zeolites usually involves crystallization from reaction mixtures containing suitable sources of alkali metal oxide, silica, alumina and water. The proportions of the various ingredients will determine the type of zeolite obtained, as well as its crystallinity and the yield of final product. However, it will be appreciated that for any particular type of crystalline zeolite a wide range of reactant ratios can be employed with varying degrees of success.

DETAILED DESCRIPTION

The synthetic zeolite described above, having pores within the range of 3 to 5.5 A units, and in its purest form from 3 to 4 A units, is prepared from an aqueous reaction mixture containing silica, alumina, and either a mixture of potassium oxide and cesium oxide, or potassium oxide, cesium oxide and a small amount, i.e., preferably less than about 3 percent, of sodium oxide. These reactants may be supplied by suitable source materials. For example, alumina may be added in the form of sodium aluminate, alumina sol, alumina trihydrate and the like; silica in the form of sodium silicate, silica gel, silica sol, etc., with silica sol being particularly preferred; potassium oxide as potassium hydroxide, potassium aluminate, potassium silicate, etc.; cesium as cesium hydroxide, cesium aluminate, etc.; and sodium as sodium hydroxide, sodium aluminate or sodium silicate. The proportions of these reactants in the initial reaction mixture are determined from the following molar ratios, which are to be regarded as critical to the successful production of a high purity and highly crystalline product substantially free of extraneous phases, and with attractive yield and utilization of reactants.

TABLE I
Reactant Molar Ratios

| | Broad | Preferred | Particularly Preferred |
|---|---|---|---|
| $SiO_2/Al_2O_3$ | 3–12 | 5–10 | 7–9 |
| $K_2O+Cs_2O/SiO_2$ | 0.20–0.40 | 0.25–0.32 | about 0.30 |
| $Cs_2O/K_2O+Cs_2O$ | 0.05–0.35 | 0.10–0.30 | 0.15–0.25 |
| $Na_2O/K_2O+Cs_2O$ | 0–0.5 | 0–0.4 | 0–0.2 |
| $H_2O/SiO_2$ | 5–12 | 7–10 | 8–9 |

It is also noted, as compared to the preparation of ZK-5, that a mere substitution of Cs ion for the N,N'-di-methyltriethylenediammonium ion will not result in the present crystalline zeolite product. The presence of potassium is also critical in preparing the present zeolites, along with the cesium, and only limited amounts of sodium may be tolerated. The only alkali metal present in the preparation of ZK-5 is sodium.

In accordance with the present process, the above reactants are thoroughly mixed at ambient temperatures; heated to a temperature of from about 60° to 120°C., preferably 80° to 110°C., most preferably 90° to 100°C; and held at such temperature for a sufficient period of time to form the crystalline zeolite product, preferably from 1 to 20 days and most preferably from 2 to 8 days. The pressure utilized will usually be about atmospheric pressure in the case of operation at or below 100°C. and will be correspondingly increased at temperatures higher than 100°C. in order to prevent substantial loss of water from the reaction mixture. Typical optimum crystallization times for temperatures of from 90 to 100°C. e.g. 100°C. will be about 48 to about 192 hours, preferably from 48 to 144 hours, more preferably about 96 to 144 hours. Higher temperatures will allow shorter crystallization times. For temperatures in the vicinity of 90°C., for example, suitable crystallization periods will usually range from about 4 to 10 days, preferably 6 to 7 days. After the formation of the crystalline zeolite phase, the zeolite crystals are filtered from the mother liquor and preferably washed throughout until the water wash has a pH of about 10 to 11. During the washing step the sodium, potassium and cesium cations may be partially removed, owing to their exchange with the hydrogen ions in the wash liquid. After the washing step the zeolite crystals are preferably dried in air at a temperature, for example, of about 210° to 260°F. The crystals may be finally activated for use as an adsorbent or as a catalyst support by heating at a temperature of about 400° to 1000°F. to thereby drive off the water of hydration, leaving a crystalline structure interlaced with canals of molecular dimensions. In the most preferred embodiment of this invention, the reactants are supplied from the following source materials; potassium as KOH, silica in the form of silica sol, alumina as β-alumina trihydrate, cesium oxide as CsOH, and sodium as NaOH. The molar ratios of these oxides are set forth in the particularly preferred amounts shown in Table I. A temperature of crystallization of 100°C. is utilized and the crystallization period is continued for about 96 hours or longer.

The products of the present invention are particularly valuable adsorbents for such purposes as separation of different size and shape molecular species, for example, in petroleum derived feeds, as well as serving as valuable catalytic materials and supports after suitable modification by base exchange and deposition of catalytically active metals by procedures well known in this art. Thus, such a catalyst would be useful for various conversion reactions, particularly hydrocarbon conversion reactions, e.g., catalytic cracking, hydrocracking, hydroisomerization, hydrodealkylation, alkylation, isomerization, reforming, hydroforming, and like processes. For these latter purposes, it will usually be desired to base exchange the zeolite with any of a variety of metal cations and/or hydrogen or ammonium cations, as discussed.

The metal cations which can be used as exchange media for the present zeolite, so as to cause the alkali metal cation content to be reduced to values of less than about 7 wt. %, and preferably less than about 4 wt. %, includes cations of metals in Groups IIA, IIIB, VIII, and IIB, particularly Groups IIIB and IIB and most particularly Group IIIB of the Periodic Table. Suitable metallic hydrogenation components which can be impregnated or incorporated into the base exchanged zeolite of the present invention in order to form superior hydrocarbon conversion catalysts for various processes involving the use and consumption of hydrogen (e.g., hydrocracking) include the metals, oxides, or sulfides of metals in Groups VIB and VIII, particularly Group VIII of the Periodic Table. Mixtures of any of the aforementioned metal cations and/or metals, oxides and sulfides can also be used depending upon the particular reaction desired and the quantity and quality of the ultimate end product desired.

DESCRIPTION OF THE PREFERRED EMBODIMENTS

The invention will be further understood by reference to the following examples.

EXAMPLE 1

General procedures for the preparation of the present zeolite in accordance with this invention A series of runs was made by the following typical preparation procedure. An aqueous liquor was prepared by dissolving potassium hydroxide containing 84 wt. %. $K_2O$ and cesium hydroxide containing 94 wt. % $Cs_2O$ in water. Alumina β-trihydrate, - Alcoa C-33 grade) was added to the hot solution and stirring continued at from 100° to 105°C. until it dissolved. The resulting liquor was cooled to room temperature and combined with an aqueous sol containing 30 to 40 wt. % $SiO_2$. The resulting mixture was agitated vigorously to give a uniform viscous hydrogel at ambient temperature, e.g. about 25°C. The amount of each ingredient, namely alumina trihydrate, cesium hydroxide, potassium hydroxide, colloidal silica sol and water, was calculated to give the desired molar composition in the resulting reaction mixture. The reaction mixtures were heated in a closed vessel to the ultimate crystallization temperature until the product crystallized. Regardless of the ultimate temperature, the reaction was preferably conducted in a closed vessel in order to curtail evaporation losses. For temperatures above 100°C. a closed vessel is required. The total crystallization period was determined by the length of time necessary to produce maximum crystallinity of the product. Product crystallinity throughout the reaction period was determined by periodically withdrawing and analyzing by X-ray diffraction a sample of crystals from the reaction mixture. The crystallization reaction was terminated at the point of maximum crystallinity by quenching the reaction mixture with cold water in an amount, for example, of about 5 volumes of 20°C. water per volume of reaction mixture. The crystalline product was separated from its mother liquor by filtration, thoroughly water washed until the effluent water wash had a pH of about 10.5 and finally dried at a temperature of about 120°C.

The following examples describe the preparation of the crystalline zeolite of the present invention using the general procedure described above. The reactant molar ratios, crystallization period, crystallization temperature, etc. were varied as indicated. The results are expressed in terms of product crystallinity and product purity. A measure of product quality and an indirect measure of product yield is the crystallinity of the product obtained in any particular run. Crystallinity listed in the following examples refers to the estimated intensity of the X-ray diffraction pattern. The X-ray diffraction traces for all of the samples measured were recorded under substantially identical instrument conditions.

EXAMPLE 2

Synthetic Zeolite Preparation

The general procedure described in Example 1 was employed for the preparation of various samples of the present cesium-containing zeolite. In accordance with the present invention, typical runs demonstrating the successful preparation of essentially pure synthetic zeolite in good yield with excellent utilization of reactants are summarized in Table II below. The molar composition of the reaction mixture from with the zeolite produced was crystallized is indicated in that TABLE II.—K-Cs ZEOLITE SYNTHESIS EXPERIMENTS

| Run | $SiO_2/Al_2O_3$ | $K_2O$ plus $Cs_2O/SiO_2$ | $Cs_2O/K_2O$ plus $Cs_2O$ | $H_2O/SiO_2$ | Crystallization | | Product inspection |
|---|---|---|---|---|---|---|---|
| | | | | | Days | °C. | |
| 1 | 6.0 | 0.27 | 0.11 | 7.5 | 8 | 100 | K-Cs zeolite, strong. |
| 2 | 6.0 | 0.27 | 0.11 | 7.5 | 7 | 90 | Do. |
| 3 | 8.0 | 0.27 | 0.11 | 7.5 | 7 | 100 | K-Cs zeolite, strong plus L, weak. |
| 4 | 8.0 | 0.30 | 0.20 | 8.0 | 4 | 100 | K-Cs zeolite, strong. |
| 5 | 8.0 | 0.30 | 0.10 | 8.0 | 7 | 100 | K-Cs zeolite, strong plus L, weak. |
| 6 | 8.0 | 0.27 | 0.11 | 10.0 | 10 | 100 | Do. |
| 7 | 6.0 | 0.30 | 0.20 | 7.5 | 2 | 100 | K-Cs zeolite, medium plus pollucite (weak). |
| 8 | 6.0 | 0.33 | 0.27 | 8.1 | 2 | 100 | Pollucite, medium plus chabazite, weak. |
| 9 | 6.0 | 0.36 | 0.33 | 8.7 | 2 | 100 | Pollucite, strong. |
| 10 | 10.0 | 0.30 | 0.20 | 8.0 | 6 | 100 | K-Cs zeolite, strong. |
| 11 | 10.0 | 0.30 | 0.20 [1] | 8.0 | 6 | 100 | Do. |
| 12 | 10.0 | 0.30 | 0.20 [2] | 8.0 | 6 | 100 | K-Cs zeolite, medium plus erionite, medium. |
| 13 | 6.0 | 0.24 [3] | | 7.0 | 3 | 125 | Chabazite, strong plus L, weak. |
| 14 | 6.0 | 0.27 | 0.11 [4] | 7.7 | 16 | 100 | L, strong. |
| 15 | 6.0 | 0.27 | 0.11 [5] | 7.7 | 16 | 100 | Do. |
| 16 | 6.0 | 0.27 | 0.11 [4] | 7.7 | 8 | 100 | Amorphous. |
| 17 | 6.0 | 0.27 | 0.11 [5] | 7.7 | 8 | 100 | Do. |

[1] Supporting alkali, 0.60 $K_2O$ plus 0.20 $Na_2O$.
[2] Supporting alkali, 0.40 $K_2O$ plus 0.40 $Na_2O$.
[3] Supporting alkali, $K_2O$ only.
[4] Supporting alkali, $Li_2O$ instead of $Cs_2O$.
[5] Supporting alkali, $Rb_2O$ instead of $Cs_2O$.

Table, together with the crystallization temperature and the crystallization period at said temperature. Further indicated are the product crystallinity and the presence of any contaminant phase, said contaminant being either an amorphous material or an extraneous crystalline zeolite material, designated either as pollucite, zeolite L, chabasite, or erionite.

This data indicates that the use of the ratios of synthesis reactants described in Table I is critical for the preparation of the present potassium-cesium crystalline aluminosilicate zeolite substantially free of extraneous phases, i.e. of other crystalline aluminosilicate zeolite products not having the superior properties of the present product described herein. It is also demonstrated that the substitution of other alkali metal hydroxides for CsOH gives a different product. Also, it is essential that the amount of NaOH present in the reaction mixture be limited to the small amounts described, in order that products such as erionite be prevented from forming during crystallization.

EXAMPLE 3

A synthetic potassium-cesium zeolite of the present invention was prepared by dissolving 53 grams of KOH and 36 grams of CsOH in 90 grams of $H_2O$. 39 grams of alumina trihydrate were added to the hot solution, and the resultant slurry was stirred at 105° to 110°C. until the alumina dissolved (about five minutes). The liquor was then cooled to room temperature, and 295 grams of silica sol (DuPont LS-40 Ludox, containing 40.8% $SiO_2$) was blended into the liquor, and this gel was charged to glass containers. The containers were sealed to prevent evaporation losses, and crystallized in an oil bath at 100°C. for 4 days. The crystallized product was then quenched by the addition of several volumes of cold water, and the resultant slurry filtered for recovery of solid product. This product was washed until the filtrate had a pH of less than 10.5, and then dried at 120°C.

EXAMPLE 4

The zeolite of the present invention prepared in Example 3 was then used to prepare a catalyst. This was accomplished by ammonium ion exchange thereof, i.e. slurrying that potassium-cesium zeolite in 10 percent ammonium nitrate solution (5 grams of solution/gram of zeolite) at 100°C. with stirring, for two hours. The product was filtered, and this exchange was repeated twice using fresh 10 percent ammonium nitrate solution, for a total of three such exchange treatments. The product was then washed three times in order to remove soluble salts. The wet cake was then slurried in water and treated with 0.2 cc. of a Pd $(NH_3)_4 Cl_2$ solution/gram of zeolite. The solution contained 25 mg. Pd/cc., and was sufficient to yield 0.5 wt. % palladium on the zeolite product. After stirring for 30 minutes at room temperature, the slurry was filtered, washed free of chloride, and dried. Prior to use, the zeolite catalyst was compacted into self-bonded granules (14-35 mesh) and calcined at 1000°F.

EXAMPLE 5

The crystalline aluminosilicate zeolite catalyst of Example 4 was tested for its hydrocracking activity utilizing a reformate feedstock having an RON of 92.2. This catalyst was contacted with that feedstock at 920°F. and 200 psig., with hydrogen added at a rate of 8 MSCF/B, and at a space velocity of 20 W/H/W, for a total of 16 hours. The upgraded product then had an RON of about 93.2.

EXAMPLE 6

The K-Cs zeolites of the present invention as prepared in Runs 1 and 2 in Table II and exchanged with $NH_4NO_3$ solution were tested for their adsorption of n-hexane. The results were as follows:

| Product of Run No. | n-hexane capacity m. mol/gram |
|---|---|
| 1 | 1.34 |
| 2 | 1.0 |

What is claimed is:

1. A method for preparing an essentially pure crystalline aluminosilicate zeolite containing cesium in inaccessible ion exchange positions, said zeolite having a composition, expressed in terms of mole ratios of oxides, as follows:

$$0.1-0.4\ Cs_2O : 0.6-0.9\ M_2O : Al_2O_3 : YSiO_2 : ZH_2O$$

wherein M is potassium and sodium, such that the ratio of sodium over potassium is up to about 1, Y is from 4 to about 7, and Z is from 0 up to about 10, which comprises crystallizing said zeolite from an aqueous reaction mixture containing alkali metal oxide, silica and alumina, the molar ratios of said constituents in the reaction mixture are with the following ranges:

| | |
|---|---|
| $SiO_2/Al_2O_3$ | 5-10 |
| $K_2O+Cs_2O/SiO_2$ | 0.25-0.32 |
| $Cs_2O/K_2O+Cs_2O$ | 0.10-0.30 |
| $Na_2O/K_2O+Cs_2O$ | 0-0.4 |
| $H_2O/SiO_2$ | 7-10 | heating said mixture to a temperature of from about 60° to 120°C., maintaining said mixture at said temperature for a sufficient period of time to form a crystallized product essentially uncontaminated by extraneous crystalline or amorphous phases, said zeolite product having the x-ray diffraction pattern values shown for K-Cs zeolite in Table A.

2. The method of claim 1, wherein said molar ratios in the reaction mixture are within the following ranges:

| | |
|---|---|
| $SiO_2/Al_2O_3$ | 7-9 |
| $K_2O+Cs_2O/SiO_2$ | about 0.3 |
| $Cs_2O/K_2O+Cs_2O$ | 0.15-0.25 |
| $Na_2O/K_2O+Cs_2O$ | 0-0.2 |
| $H_2O/SiO_2$ | 8-9 |

3. The method of claim 1 wherein Y is from 6 to about 7.

* * * * *